(12) United States Patent
Chen

(10) Patent No.: US 6,980,905 B2
(45) Date of Patent: Dec. 27, 2005

(54) REMOTE-END ROUTE-CALCULATING NAVIGATION SYSTEM

(75) Inventor: Stephen Chen, Changhua (TW)

(73) Assignee: Elead Electronics Co., Ltd., Changhua (TW)

( * ) Notice: Subject to any disclaimer, the term of this patent is extended or adjusted under 35 U.S.C. 154(b) by 0 days.

(21) Appl. No.: 09/832,808

(22) Filed: Apr. 12, 2001

(65) Prior Publication Data

US 2002/0152023 A1 Oct. 17, 2002

(51) Int. Cl.$^7$ .............................................. G01C 21/34
(52) U.S. Cl. ..................... 701/209; 701/202; 701/210; 340/990
(58) Field of Search ..................... 701/202, 208, 701/209, 210, 211, 213; 73/178 R; 340/988, 990, 995

(56) References Cited

U.S. PATENT DOCUMENTS

| | | | |
|---|---|---|---|
| 5,067,081 A | * 11/1991 | Person | 340/995 |
| 5,544,061 A | * 8/1996 | Morimoto et al. | 340/995 |
| 5,745,867 A | * 4/1998 | Mills | 701/202 |
| 5,774,827 A | * 6/1998 | Smith, Jr. et al. | 701/210 |
| 5,835,881 A | * 11/1998 | Trovato et al. | 701/211 |
| 5,987,381 A | * 11/1999 | Oshizawa | 340/995 |
| 6,052,645 A | * 4/2000 | Harada | 701/209 |
| 6,070,123 A | * 5/2000 | Beyer et al. | 340/990 |
| 6,169,955 B1 | * 1/2001 | Fultz | 701/211 |
| 6,178,378 B1 | * 1/2001 | Leibold | 701/209 |
| 6,249,740 B1 | * 6/2001 | Ito et al. | 701/202 |
| 6,278,939 B1 | * 8/2001 | Robare et al. | 701/209 |
| 6,278,941 B1 | * 8/2001 | Yokoyama | 701/209 |
| 6,292,743 B1 | * 9/2001 | Pu et al. | 701/202 |
| 6,313,791 B1 | * 11/2001 | Klanke | 701/213 |
| 6,324,467 B1 | * 11/2001 | Machii et al. | 701/202 |
| 6,351,708 B1 | * 2/2002 | Takagi et al. | 701/202 |
| 6,385,535 B2 | * 5/2002 | Ohishi et al. | 701/209 |
| 6,430,502 B1 | * 8/2002 | Pournain et al. | 701/211 |

* cited by examiner

Primary Examiner—Gary Chin
(74) Attorney, Agent, or Firm—Troxell Law Office PLLC

(57) ABSTRACT

A remote-end route-calculating navigation system particularly relates to a system which is not equipped with expensive or costly navigation equipment for a navigation requester to acquire complete and instant navigation information therefrom. It is mainly made up of an information center in cooperation with a plurality of navigation requesters. The information center includes at least a main information unit having an electronic map and route calculating and navigating software, and a communication device capable of transmitting/receiving phonic and digital information. The navigation requester includes a satellite positioning device and a communication device storing the telephone number of the information center and the address of the digital information network so as to provide complete information for navigation requesters.

4 Claims, 5 Drawing Sheets

REMOTE-END ROUTE-CALCULATING NAVIGATION SYSTEM

BACKGROUND OF THE INVENTION

The present invention relates to a remote-end route-calculating navigation system and more particularly to a system that is not equipped with expensive or costly navigation equipment for a navigation requester to acquire complete and instant navigation information. It is mainly made up of an information center in cooperation with a plurality of navigation requesters. The information center includes at least a main information unit having an electronic map and route calculating and navigating software, and a communication device capable of transmitting/receiving phonic and digital information. The navigation requester includes a satellite positioning device and a communication device storing the telephone number of the information center and the address of the digital information network so as to provide complete information for navigation requesters.

Roads in big cities become more and more complicated for drivers to instantly identify as a result of rapid expansion of cities all over the world. People driving in holidays through cities to remote urban areas for fun and excitement often find themselves easily lost in the unfamiliar roads in trips. So, navigation systems have been developed and sold in markets all over the world. They are popularly adopted by drivers in recent years in modem cities all over the world due to their facilities in use. The common conventional navigation systems are equipped with a terminal having a navigation software which is made up of an electronic map and a route calculating software; and a satellite positioning device for identifying the location of each user. A user first pinpoints a target place on an electronic map and a preferred trip route is obtained through the calculation of via the terminal according to the route information on the electronic map and shown together with on a display whereby a driver can drive a car on a suggested route. This is the basic operation mode of a modern navigation system. Although it can carry out a navigation purpose, it still has the following disadvantages in practical use:

1. Users have to spend a lot of money to purchase a computer, electronic maps and an operation system.
2. Setting target places is relatively difficult and time consuming. Besides, general people are not good at making use of a map, not to mention using such a system without a mouse and keyboard on a vehicle, making the operation rather hard.
3. Alternation or updating of roads on an electronic map is not easy; in general an electronic map is recorded on a VCD, and a user must regularly buy a new edition of an electronic map or he or she can not cope with frequently varied road information.
4. Sometimes, the calculated routes are rather unreasonable and can not be corrected.

It can be seen that people spending a lot fortune on such a navigation system can not be satisfied with the outcome of navigation. Finding the problem with the conventional navigation systems, the present inventor provides for a navigation method and equipment, using an information center in combination with a plurality of navigation requesters for the users to acquire instant and ready navigation on roads.

SUMMARY OF THE INVENTION

Therefore, the primary object of the present invention is to provide a simple, complete and cheap navigation method which helps drivers save a large sum of budget in purchasing navigation equipment for vehicles.

DETAILED DESCRIPTION OF THE PREFERRED EMBODIMENTS

Figure 1:
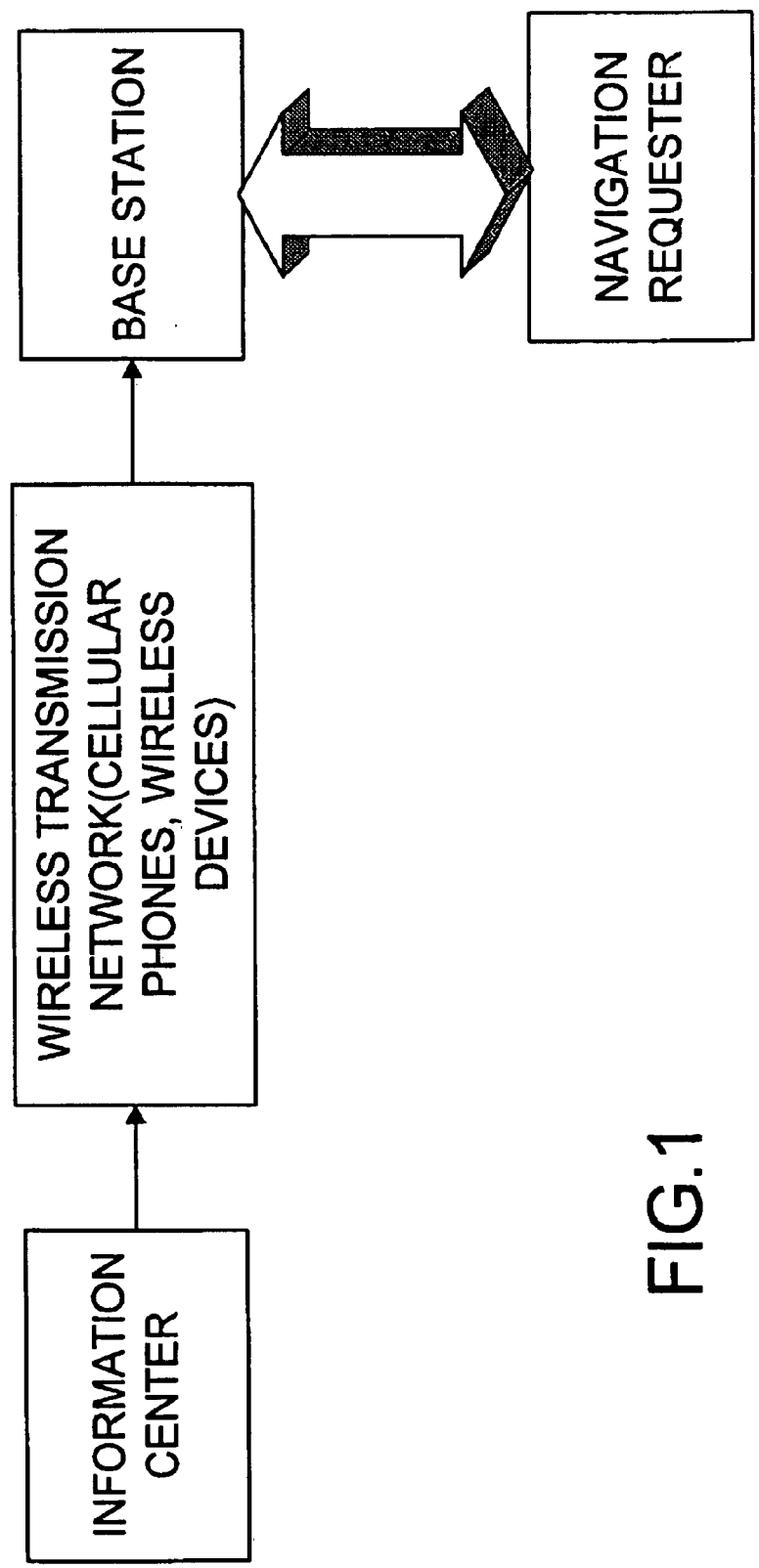
FIG. 1 is a diagram showing the practical operation of the present invention.
Figure 2:
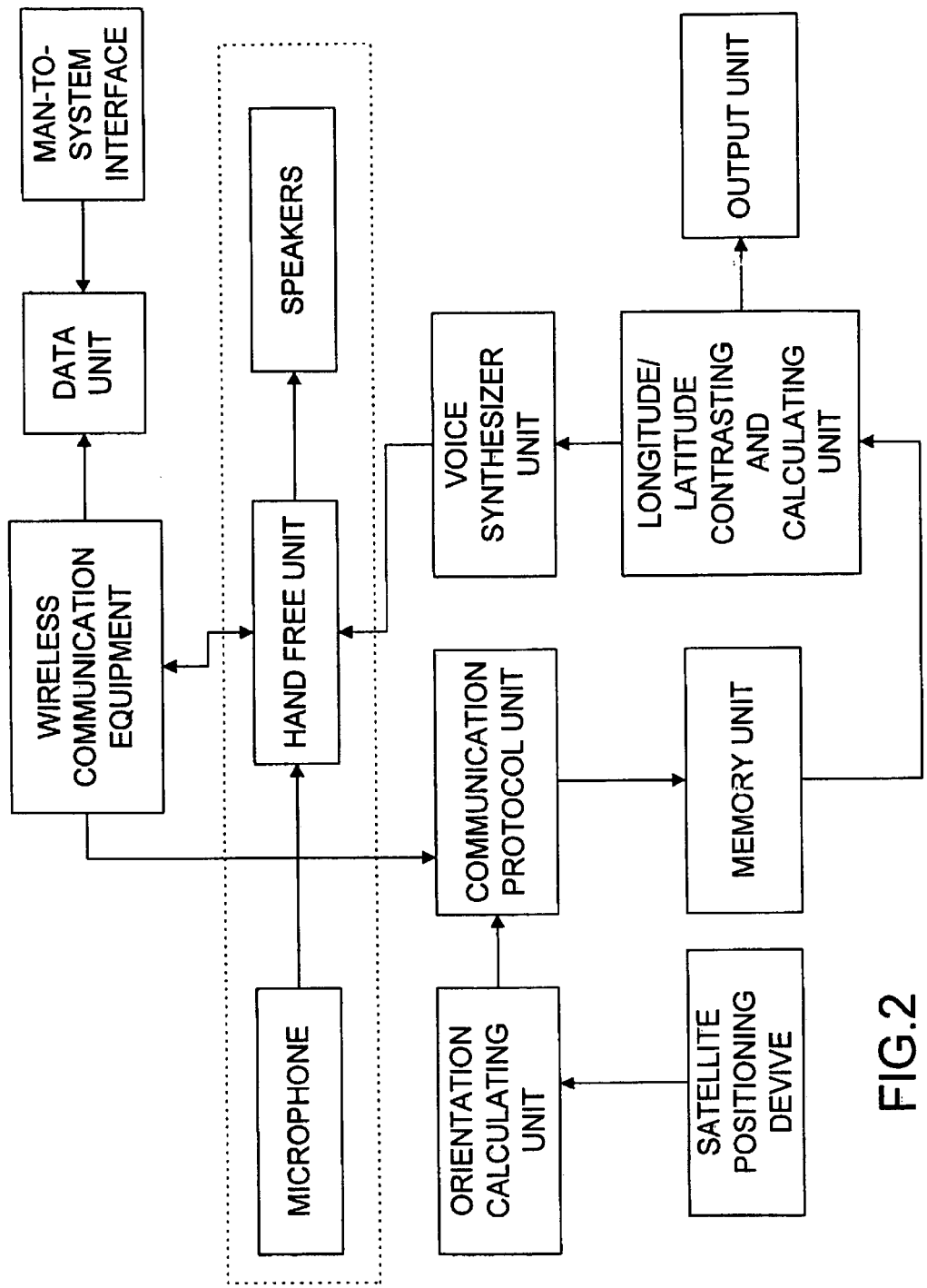
FIG. 2 is a block diagram of the navigation system of the present invention.

Referring to FIGS. 1, 2, a remote-end route-calculating navigation system mainly comprises at least one or more than one information center A and a plurality of navigation requesters B, wherein:

The information center A includes at least one main information unit consisting of an electronic map and route calculating software and a communication device capable of transmitting/receiving phonic and digital information.

The navigation requester comprises a satellite positioning device 1 and a communication device 2 having a man-to-system interface 28 and an output unit 27, a data unit 26, a hand free unit 29, a voice synthesizer 25, a wireless communication equipment 3, a longitude/latitude contrasting and calculating unit 24, a communication protocol unit 22, a memory unit 23, an orientation calculating unit 21.

The man-to-system interface 28 generally refers to a keyboard matrix, hand-write input, touch-on screen, microphone that are interfaces permitting users to input data.

The output unit 27 generally refers to a monitor, speakers and etc. It is a unit for permitting a system to output suggestions or alarms.

The data unit 26 is used to store telephone numbers of the information center and the addresses of digital networks and etc. that are data used to couple to the information center.

The hand free unit 29 permits a user to communicate with the information center by way of a cellular phone or a communication device without holding a phone device in operation.

The voice synthesizer 25 is stored with suggested driving routes, conditions and etc. to cope with the downloaded digital data from the information center The wireless communication equipment 3 can be a cellular phone or other wireless communication devices.

The longitude/latitude contrasting and calculating unit 24 is adapted for receiving signals from a satellite positioning device and cooperating with electronic maps downloaded from the information center so as to pinpoint instant positions of a user.

The communication protocol unit 22 is stored with a wireless communication protocol, a satellite positioning signals coding protocol, a digital information transmitting protocol and other various protocols and codes and decodes indispensably required.

The memory unit 23 is adapted for recording data including information downloaded from the information center, displaying information or inputting information.

The orientation calculating unit 21 is used to receive signals from a satellite positioning device for consecutive usage.

The satellite positioning device 1 is used to receive signals from satellites.

Figure 3A:
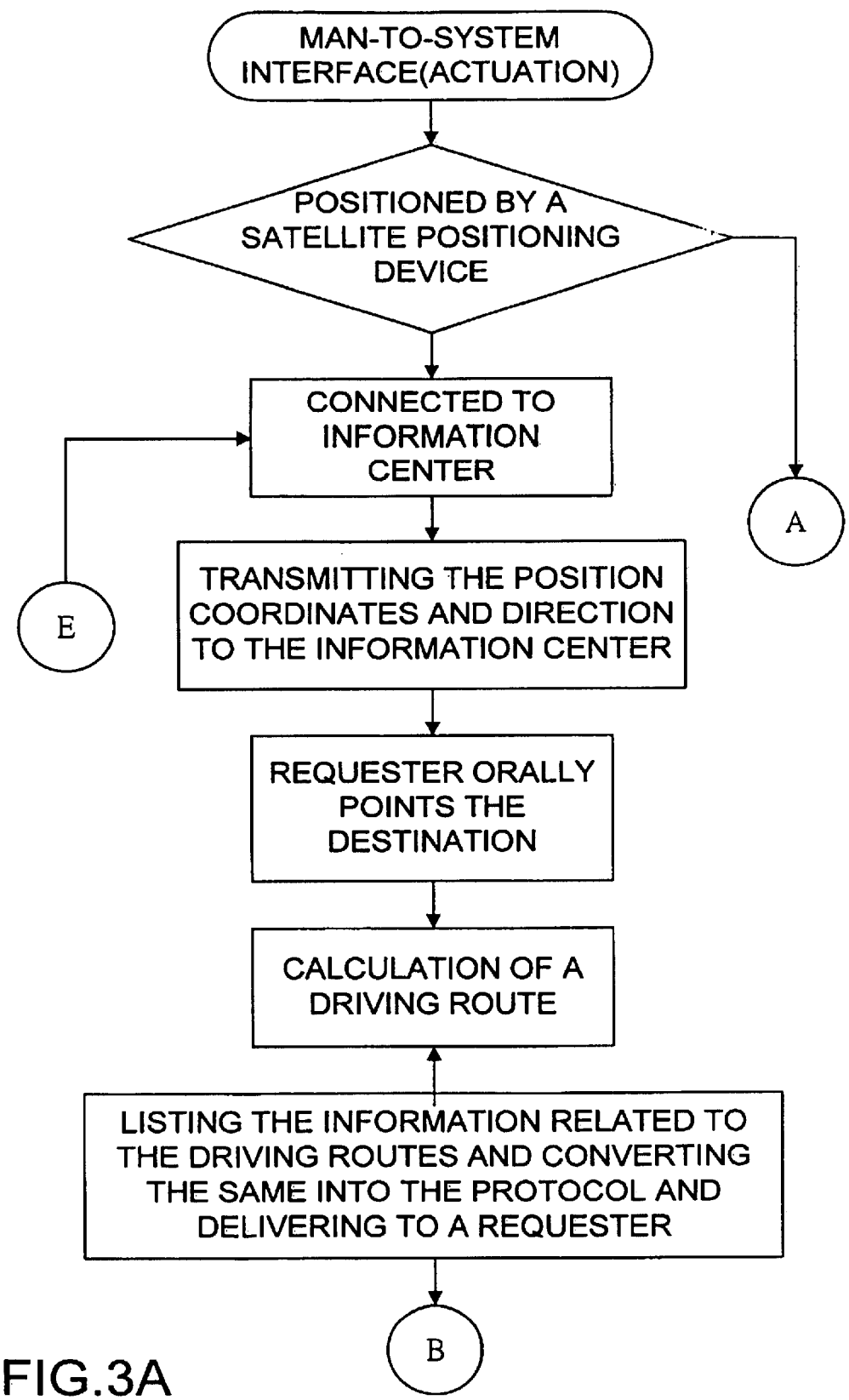
FIGS. 3A, 3B, 3C is a flow chart of the present invention.
Figure 3B:
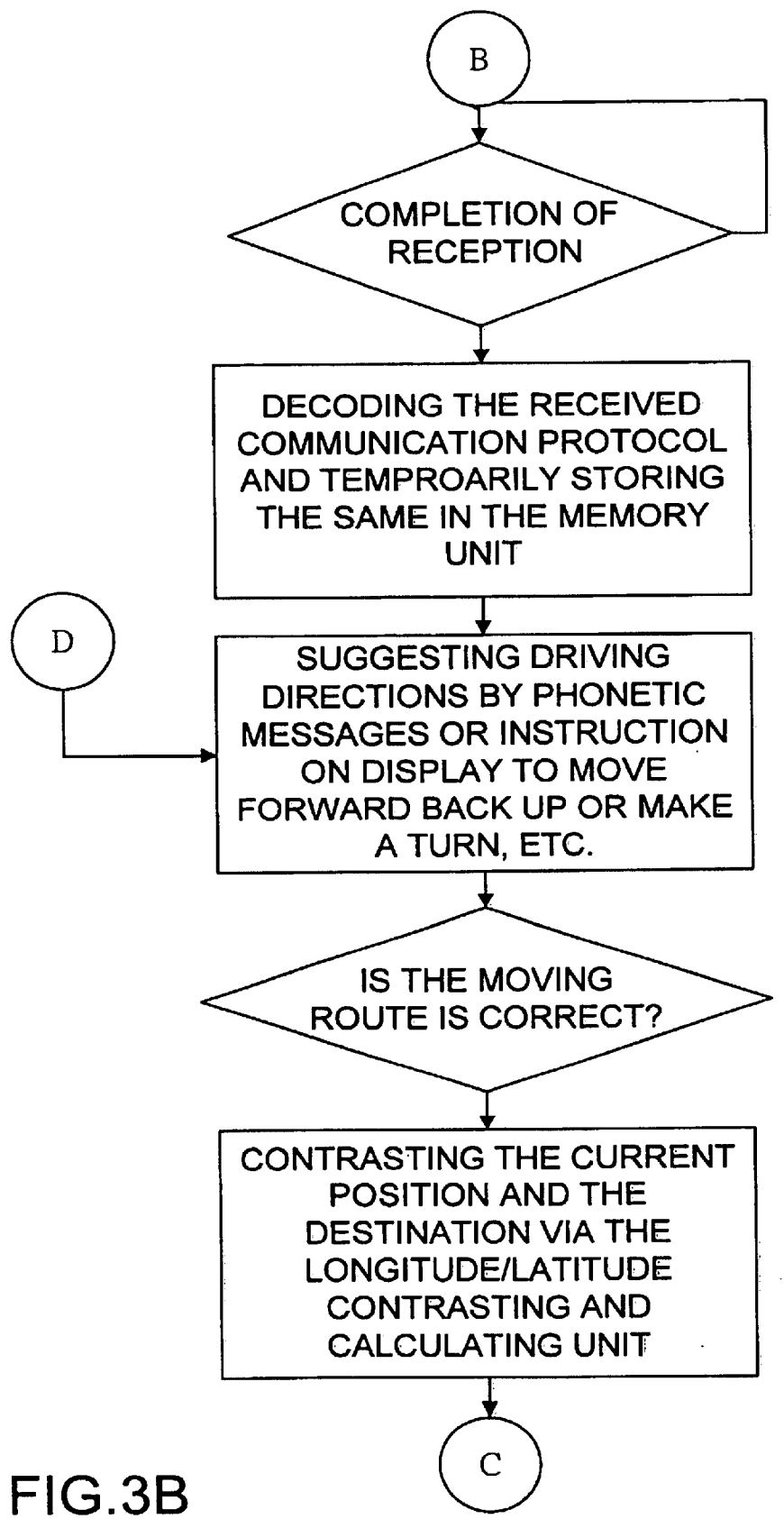
Figure 3C:
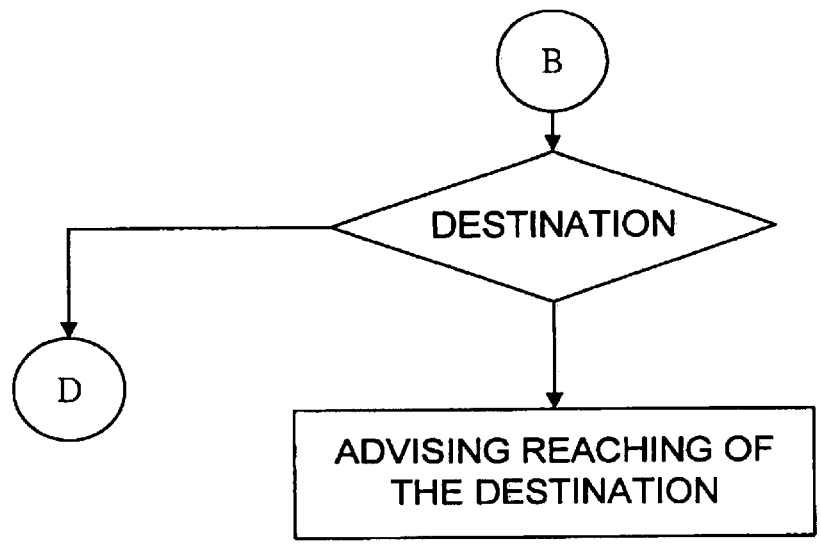
Figure 3C:
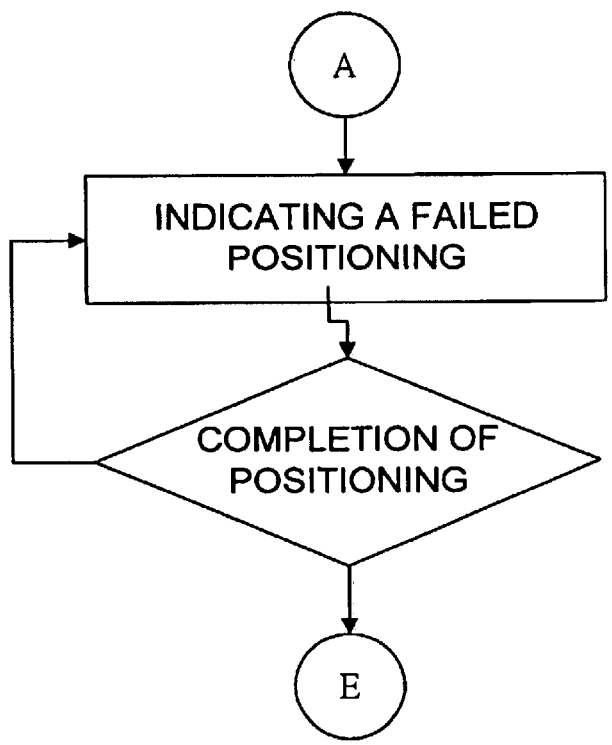

Referring to FIGS. 3A, 3B, 3C, the flow chart of the present invention is illustrated.

1. A user activates the system of the present invention to operate by way of the man-to-system interface 28 of the communication device 2.
2. Receiving satellite signals by way of the satellite positioning device 1 and transforming the received signals into available digital data by way of the orientation calculating unit 21; temporarily storing the data in the memory unit 23 and pinpointing corresponding locations by way of the a longitude/latitude contrasting and calculating unit 24.
3. The communication device 2 (a cellular phone or other wireless communication device) is connected to the information center A and is able to feed back to the information center A of its instant position.
4. A user orally informs the operators in the information center A of his or her intended driving destination.
5. The position, direction and destination of the user is pinpointed on the electronic map of the information center A.
6. A proper route is calculated by a main information unit in the information center
7. Transforming the calculated route including turns, road conditions, distances and etc. into protocol based signals to the user.
8. The wireless communication equipment 3 in the communication device 2 of the user receives the information delivered from the information center A and it is checked if the whole information is completely received. If it is completely received, then the connection to the information center A is cut off
9. The received protocol based signals are decoded by the communication protocol unit 22 and are temporarily stored in the memory unit 23.
10. The longitude/latitude contrasting and calculating unit 24 in the communication device 2 contrasts the coordinates of itself with that of the electronic map downloaded from the information center A.
11. The data obtained from the contrast of longitude and latitude by the longitude/latitude contrasting and calculating unit 24 is used to control the voice synthesizer unit 25 to output indication messages such as acoustic instructions of to move forward or to back up, to turn left (right) at a certain distance or to display by way of monitor.
12. As the user is on the move, the longitude/latitude contrasting and calculating unit 24 of the communication device 2 will pick up signals from satellites and check if the user is moving in a right direction with a right distance. If not, the procedure of the step 11 will be run again until a target destination is reached.

It can be clearly seen from the above cited procedures that a user has only to press a button and orally indicate the target destination to complete a setting of navigation. Moreover, since the travelling routes are all provided by an information center, so, such routes can be instantly varied according to the road or traffic conditions, such as traffic jam, closing of roads, accidents and etc. Thereby, it is more user friendly and the purchasing and installation cost are greatly reduced.

I claim:

1. A remote-end route-calculating navigation system, comprising:

an information center having at least one main information unit, said main information unit having an electronic map, route calculating software and a first communication device capable of transmitting/receiving phonic and digital information;

a navigation requester having a satellite positioning device and a second communication device operable to automatically terminate a connection with said first communication device responsive to route information being completely received thereacross, said second communication device having a man-to-system interface, an output unit, a data unit, a hands-free unit, a voice synthesizer, wireless communication equipment, a longitude/latitude contrasting and calculating unit, a communication protocol unit, a memory unit, and an orientation calculating unit, said man-to-system interface receiving input from a user for controlling said navigation requester, said output unit providing audio and video messages to said user, said data unit being a memory device for storing telephone numbers of said information center and addresses of digital networks necessary for coupling to said information center, said hands-free unit allowing the user to communicate with said information center without holding the second communication device during use; said voice synthesizer having stored messages saved in a voice synthesizer memory, said longitude/latitude contrasting and calculating unit being adapted for receiving signals from said satellite positioning device and cooperating with electronic maps downloaded from said information center so as to identify instant positions of said user, said communication protocol unit having communication protocols saved in a protocol memory, said memory unit being adapted for recording data downloaded from said information center, said orientation calculating unit receiving signals from said satellite positioning device for consecutive usage, said satellite positioning device receiving signals from positioning satellites.

2. The remote-end route-calculating navigation system as claimed in claim 1 wherein said information center and said first communication device share a common communication protocol whereby two-way transmission and reception of information can be carried out therebetween.

3. The remote-end route-calculating navigation system as claimed in claim 2 wherein said man-to-system interface of said second communication device is equipped with an intelligence button which can be pressed down to automatically connect to said information center for transmitting or receiving information thereto or therefrom.

4. The remote-end route-calculating navigation system as claimed in claim 1 wherein said navigation system provides traffic-related information.

* * * * *